(12) United States Patent
Spahn et al.

(10) Patent No.: US 6,577,785 B1
(45) Date of Patent: Jun. 10, 2003

(54) COMPOUND SEMICONDUCTOR OPTICAL WAVEGUIDE SWITCH

(75) Inventors: Olga B. Spahn, Albuquerque, NM (US); Charles T. Sullivan, Albuquerque, NM (US); Ernest J. Garcia, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 38 days.

(21) Appl. No.: 09/928,199

(22) Filed: Aug. 9, 2001

(51) Int. Cl.[7] ............................ G02B 6/26; G02B 6/42
(52) U.S. Cl. ........................................................ 385/22
(58) Field of Search .............................. 385/22, 15, 16

(56) References Cited

U.S. PATENT DOCUMENTS

| | | | | |
|---|---|---|---|---|
| 5,715,337 A | * | 2/1998 | Spitzer et al. | 385/4 |
| 6,229,947 B1 | | 5/2001 | Vawter et al. | 385/132 |
| 2002/0031305 A1 | * | 3/2002 | Ticknor et al. | 385/48 |
| 2002/0064192 A1 | * | 5/2002 | Missey et al. | 372/20 |
| 2002/0071627 A1 | * | 6/2002 | Smith et al. | 285/15 |

OTHER PUBLICATIONS

"An SOI Optical Microswitch Integrated With Silicon Waveguides and Touch–down Micromirror Actuators," YoungHyun Jin et al, IEEE, 2000, pp. 43–44.*

Z.L. Zhang, G.A. Porkolab and N.C. MacDonald, "Submicron, Movable Gallium Arsenide Mechanical Structures and Actuators," *Proceedings of IEEE Micro Electro Mechanical Systems Conference,* Travemunde, Germany, Feb. 4–7, 1992, pp. 72–77.

K. Hjort, J. Soderkvisk and J.–A. Schweitz, "Gallium Arsenide as Mechanical Material," *Journal of Micromechanics and Microengineering,* vol. 4, pp. 1–13 (1993).

Y. Uenishi, H. Tanaka and H. Ukita, "Characterization of AlGaAs Microstructure Fabricated by AlGaAs/GaAs Micromachining," *IEEE Transactions on Electron Devices,* vol. 41, pp. 1778–1783, Oct. 1994.

T.T.H. Eng, S.C. Kan and G.K.L. Wong, "Surface–Micromachined Epitaxial Silicon Cantilevers as Moveable Optical Waveguides on Silicon–on–Insulator Substrates," *Sensors and Actuators A,* vol. A 49, pp. 109–113, 1995.

E. Olier, P. Labeye and F. Revol, "Micro–Opto Mechanical Switch Integrated on Silicon," *Electronics Letters,* vol. 31, pp. 2003–3005, Nov. 9, 1995.

K. Hjort, "Sacrificial Etching of III–V Compounds for Micromechanical Devices," *Journal of Micromechanics and Microengineering,* vol. 6, pp. 370–375, 1996.

E. Ollier and P. Mottier, "Integrated Electrostatic Micro–Switch for Optical Fibre Networks Driven by Low Voltage," *Electronics Letters,* vol. 32, pp. 2007–2009, Oct. 10, 1996.

P. Mounaiz, P. Delobelle, X. Melique, L. Bornier and D. Lippens, "Micromachining and Mechanical Properties of GaInAs/InP Microcantilevers," *Materials Science and Engineering,* vol. B51, pp. 258–262, 1998.

(List continued on next page.)

*Primary Examiner*—Michael C. Zarroli
(74) *Attorney, Agent, or Firm*—John P. Hohimer

(57) ABSTRACT

An optical waveguide switch is disclosed which is formed from III–V compound semiconductors and which has a moveable optical waveguide with a cantilevered portion that can be bent laterally by an integral electrostatic actuator to route an optical signal (i.e. light) between the moveable optical waveguide and one of a plurality of fixed optical waveguides. A plurality of optical waveguide switches can be formed on a common substrate and interconnected to form an optical switching network.

21 Claims, 7 Drawing Sheets

OTHER PUBLICATIONS

J.L. Leclercq, R.P. Ribas, J.M. Karam and P. Viktorovitch, "III–V Micromachined Devices for Microsystems," *Microelectronics Journal,* vol. 29, pp. 613–619, 1998.

D. Haronian, "Geometrical Modulation–Based Interferometry for Displacement Sensing Using Optically Coupled Suspended Waveguides," *Journal of Micromechanical Systems,* vol. 7, pp. 309–314, Sep. 1998.

O.B. Spahn, C. Sullivan, J. Burkhart, C. Tigges and E. Garcia, "GaAs–Based Microelectromechanical Waveguide Switch," *Proceedings of the 2000 IEEE/LEOS International Conference on Optical MEMS,* Koloa, Hawaii, USA, Aug. 21–24, 2000, pp. 41–42.

* cited by examiner

Section 1 - 1

COMPOUND SEMICONDUCTOR OPTICAL WAVEGUIDE SWITCH

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates in general to optical waveguides, and in particular to an optical waveguide switch formed from III–V compound semiconductor layers. The optical waveguide switch can be used, for example, to form an optical waveguide switching network for signal routing in fiber optic communications and data transfer.

BACKGROUND OF THE INVENTION

There is currently a need for low-insertion-loss gangable optical switches to provide signal routing for fiber optics communications and data transfer. Many approaches have been recently proposed to fill this need, based primarily on silicon micromachining of tiltable mirrors or deflectable cantilevered waveguides (see e.g. E. Ollier et al, "Micro-Opto Mechanical Switch Integrated on Silicon," *Electronics Letters*, vol. 31, pp. 2003–2005, Nov. 9, 1995; and E. Ollier et al, "Integrated Electrostatic Micro-Switch for Optical Fiber Networks Driven by Low Voltage," *Electronics Letters*, vol. 32, pp. 2007–2009, Oct. 10, 1996).

The present invention represents an advance in the art of optical waveguide switching compared to previous optical waveguide switches formed from polycrystalline silicon (also termed polysilicon) by providing a moveable optical waveguide formed from a plurality of epitaxially-deposited and patterned III–V compound semiconductor layers.

An advantage of the present invention is that the III–V compound semiconductor layers are of high quality, being epitaxially grown as single crystals with atomically flat interfaces and well-controlled layer thicknesses; whereas polycrystalline silicon comprises a plurality of microcrystals with random orientation.

Another advantage is that the III–V compound semiconductor layers wherefrom the optical switch of the present invention is formed, can be epitaxially deposited with very low residual stress to limit any vertical deflection of the moveable optical waveguide therein; whereas polycrystalline silicon can have substantial residual stress which must be reduced by annealing at high temperature.

These and other advantages of the present invention will become evident to those skilled in the art.

SUMMARY OF THE INVENTION

The present invention relates to an optical waveguide switch that comprises a moveable optical waveguide formed from a plurality of III–V compound semiconductor layers epitaxially deposited on a substrate, with the moveable optical waveguide having a portion thereof cantilevered above the substrate, and with an end of the cantilevered portion being moveable in the plane of the substrate. The optical waveguide switch further comprises an electrostatic actuator operatively coupled to the moveable optical waveguide to move the end of the cantilevered portion in the plane of the substrate and into optical alignment with one of a plurality of fixed optical waveguides formed on the substrate from the same plurality of epitaxially-deposited III–V compound semiconductor layers.

The plurality of epitaxially-deposited III–V compound semiconductor layers used to form the optical waveguide switch include a high-refractive-index compound semiconductor layer sandwiched between a pair of lower-refractive-index compound semiconductor layers. The high-refractive-index III–V compound semiconductor layer can comprise gallium arsenide (GaAs), gallium arsenide antimonide (GaAsSb) or indium gallium arsenide (InGaAs). The lower-refractive-index III–V compound semiconductor layer can comprise aluminum gallium arsenide (AlGaAs), aluminum arsenide antimonide (AlAsSb) or indium aluminum arsenide (InAlAs). The substrate can comprise GaAs or indium phosphide (InP), with the substrate being lattice matched to the III–V compound semiconductor layers epitaxially deposited thereon.

The electrostatic actuator can comprise one or more pairs of meshed electrostatic combs, with each pair of the meshed electrostatic combs further comprising a fixed electrostatic comb supported on the substrate, and a moveable electrostatic comb attached to the cantilevered portion of the moveable optical waveguide. Each electrostatic comb comprises a plurality of spaced fingers which are interconnected.

A plurality of stops can be formed on the substrate to limit motion of the cantilevered portion of the moveable optical waveguide to facilitate precise optical alignment with the fixed optical waveguides. An anti-reflection coating can be deposited on the end of the cantilevered portion of the moveable optical waveguide to reduce an optical loss in coupling light between the moveable optical waveguide and each fixed optical waveguide. Another anti-reflection coating can be provided on the end of each fixed optical waveguide proximate to the end of the cantilevered portion of the moveable optical waveguide for reduced optical coupling loss.

The present invention further relates to an optical waveguide switch that comprises a III–V compound semiconductor substrate, a pair of fixed optical waveguides formed on the substrate from a plurality of III–V compound semiconductor layers including a pair of cladding layers sandwiched about a core layer, and a moveable optical waveguide formed on the substrate from the plurality of III–V compound semiconductor layers, with the moveable optical waveguide having a cantilevered end thereof which is electrostatically moveable into alignment with one or the other of the pair of fixed optical waveguides. The cantilevered end of the moveable optical waveguide can optionally include an anti-reflection coating formed thereon to reduce an optical coupling loss between the moveable optical waveguide and each fixed optical waveguide.

In the optical waveguide switch, the core and cladding layers can comprise, for example, gallium arsenide (GaAs) and aluminum gallium arsenide (AlGaAs), respectively, when the substrate comprises gallium arsenide (GaAs). When the substrate comprises indium phosphide (InP), the core and cladding layers can comprise respectively gallium arsenide antimonide (GaAsSb) and aluminum arsenide antimonide (AlAsSb), or indium gallium arsenide (InGaAs) and indium aluminum arsenide (InAlAs).

The optical waveguide switch preferably further includes an electrostatic actuator operatively coupled to electrostatically move the cantilevered end of the moveable optical waveguide into alignment with one of the pair of fixed optical waveguides. The electrostatic actuator can comprise one or more pairs of meshed electrostatic combs, with each pair of the meshed electrostatic combs further comprising a fixed electrostatic comb supported on the substrate, and a moveable electrostatic comb attached to the cantilevered end of the moveable optical waveguide.

The present invention also relates to a plurality of optical waveguide switches formed on a common substrate and interconnected to form an optical switching network that can be electronically reconfigured to route optical signals (i.e. comprising light with information encoded therein) between one or more input optical fibers and a plurality of output optical fibers.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1:
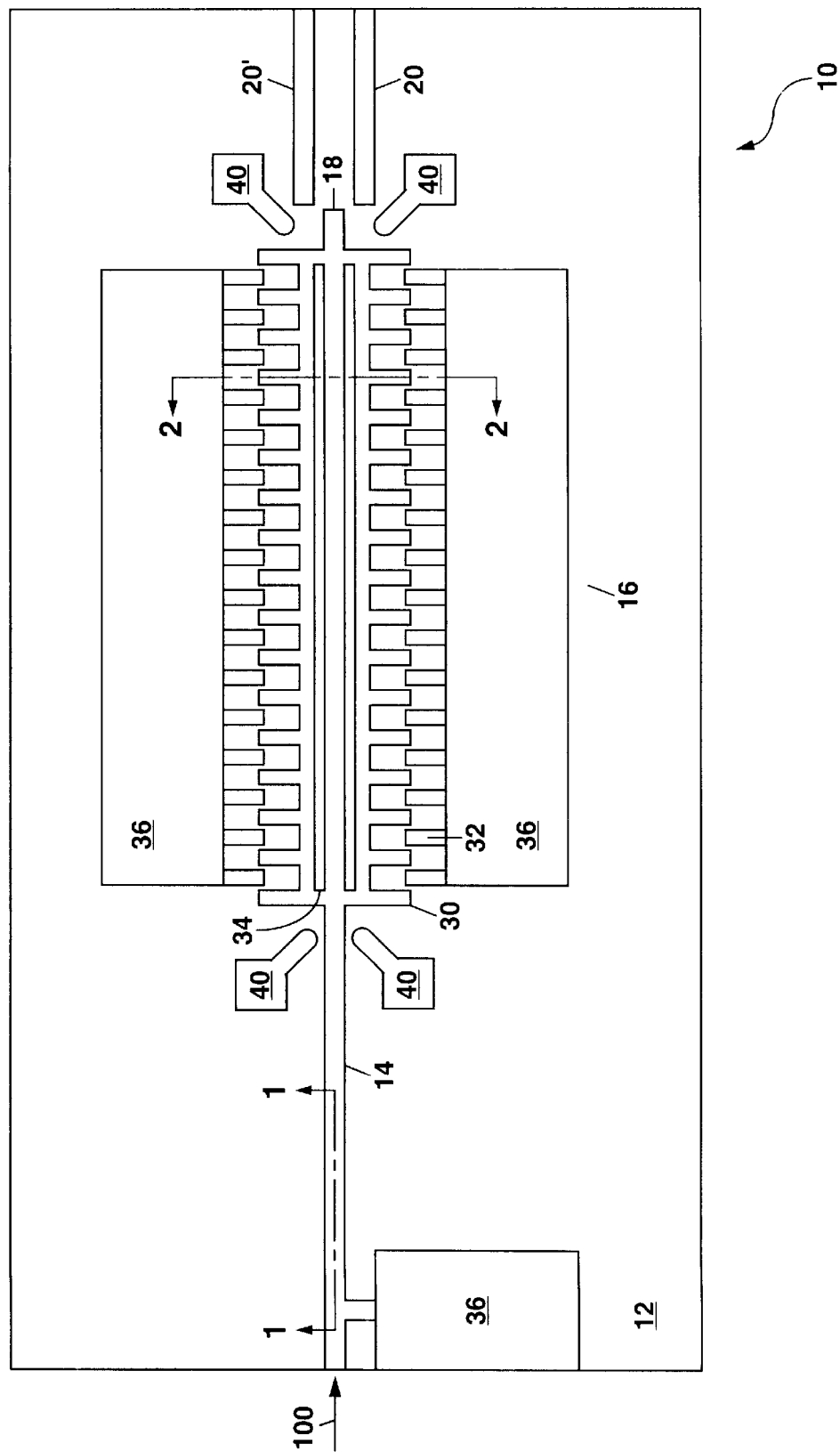
FIG. 1 schematically illustrates in plan view a first example of an optical waveguide switch according to the present invention.

Referring to FIG. 1, there is shown a first example of an optical waveguide switch 10 according to the present invention. In FIG. 1, the optical waveguide switch 10, which is formed on a III–V compound semiconductor substrate 12, comprises a moveable optical waveguide 14 and an electrostatic actuator 16 which can be used to move a cantilevered end 18 of the moveable optical waveguide 14 into optical alignment with one of a pair of fixed optical waveguides 20 and 20' to provide a reconfigurable path for routing of a light beam 100 through the switch 10.

The optical waveguide switch 10 is shown in FIG. 1 in an "as-fabricated" position with the cantilevered end 18 located about half-way between the fixed optical waveguides 20 and 20'. In this position which also corresponds to an unactivated position of the switch 10, no light 100 is coupled between the moveable optical waveguide 14 and either of the fixed optical waveguides 20 or 20'. This position thus represents an "off" position for the switch 10.

In FIG. 1, the substrate 12 comprises a monocrystalline III–V compound semiconductor which has a lattice constant that is substantially matched (i.e. substantially equal) to the lattice constants of the plurality of III–V compound semiconductor layers which are epitaxially deposited thereon to build up the structure of the optical waveguide switch 10. This lattice matching of the substrate 12 and the various III–V compound semiconductor layers helps to minimize any internal stress which might otherwise bow a cantilevered portion of the moveable optical waveguide 14 out of the plane of the substrate 12, thereby degrading or preventing the coupling of the light 100 between the moveable optical waveguide 14 and a selected fixed optical waveguide 20 or 20'. The length of the cantilevered portion can be, for example, 350–750 μm.

Figure 2:
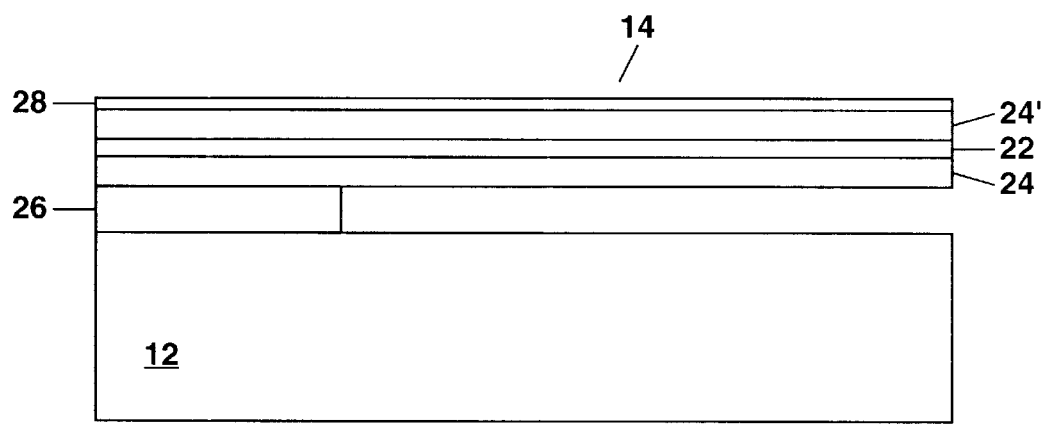
FIG. 2 shows a schematic cross-section view of the optical waveguide switch of FIG. 1 along the section line 1—1 in FIG. 1.

To form optical waveguides in the plurality of III–V compound semiconductor layers, the various layer compositions are selected to provide a relatively high-refractive-index core layer 22 sandwiched between a pair of lower-refractive-index cladding layers 24 and 24' as shown in FIG. 2. When the substrate 12 comprises gallium arsenide (GaAs), the core layer 22 can comprise GaAs, and the cladding layers 24 and 24' can comprise aluminum gallium arsenide (AlGaAs). Alternately, the core and cladding layers can each comprise $Al_xGa_{1-x}As$, with the core layer 22 having a lower aluminum content, x, than the cladding layers 24 and 24'.

When the substrate comprises indium phosphide (InP), the high-refractive-index core layer 22 can comprise, for example, gallium arsenide antimonide (GaAsSb) and the lower-refractive-index cladding layers 24 and 24' can comprise aluminum arsenide antimonide (AlAsSb). The combination of an indium gallium arsenide (InGaAs) high-refractive-index core layer 22 and indium aluminum arsenide (InAlAs) lower-refractive-index cladding layers 24 and 24' can also be used for an InP substrate 12.

Those skilled in the art will understand that other types of III–V compound semiconductor substrates 12 can be used based on binary or ternary III–V compound semiconductor alloys. An example of a ternary substrate material is InGaAs. For any given III–V compound semiconductor substrate 12, various binary, ternary or quaternary compositions can be selected for the core layer 22 and the cladding layers 24 and 24' subject to the constraint that these layers 22, 24 and 24' be substantially lattice matched to the substrate 12 to minimize internal stress, and also subject to the constraint that the refractive index of the core layer 22 be higher than that of the cladding layers 24 and 24'.

Specific examples of the compositions of the III–V compound semiconductor layers, 22, 24 and 24' will now be given. These examples are not intended to limit the scope of the present invention, but are merely instructive and indicate preferred combinations of the III–V compound semiconductor layers for particular substrate materials. In the case of a device 10 formed on a GaAs substrate 12, the semiconductor alloy composition $Al_xGa_{1-x}As$ is substantially lattice matched to GaAs over the entire range $0 \leq x \leq 1$ so that the core layer 22 can comprise either GaAs or $Al_xGa_{1-x}As$ with a low aluminum mole fraction, x (e.g. $x \leq 0.4$), and with the cladding layers 24 and 24' each comprising $Al_xGa_{1-x}As$ with a higher aluminum mole fraction, x (e.g. $x \geq 0.5$). In the case of an optical waveguide switch 10 formed on an InP substrate 12, the InGaAs core layer 22 can comprise $In_{0.53}Ga_{0.47}As$, and the InAlAs cladding layers 24 and 24' can comprise $In_{0.52}Al_{0.48}As$. Alternately, the device 10 on the InP substrate 12 can be formed using a GaAsSb core layer 22 comprising $GaAs_{0.51}Sb_{0.49}$, and AlAsSb cladding layers 24 and 24' comprising $AlAs_{0.56}Sb_{0.44}$. Indium gallium phosphide (InGaP) can be used as the sacrificial material 26 for a device 10 formed on an InP substrate 12.

FIG. 2 shows a portion of the length of the moveable optical waveguide 14 along the section line 1—1 in FIG. 1 to show the epitaxial layer structure of the various III–V compound semiconductor layers in the optical waveguide switch 10. Each III–V compound semiconductor layer in FIG. 2 can be epitaxially deposited by a suitable deposition method known to the art, such as metalorganic chemical vapor deposition (MOCVD), molecular beam epitaxy (MBE) or liquid phase epitaxy (LPE). The various III–V compound semiconductor layers in FIG. 2 are blanket deposited over the substrate 12 and are subsequently patterned as described hereinafter to form the structure of the optical waveguide switch 10.

The term "patterning" as used herein denotes a series of semiconductor manufacturing steps that are well known in the art including applying a photoresist to the substrate 12 (also termed a wafer), prebaking the photoresist, aligning the substrate 12 with a photomask, exposing the photoresist through the photomask, developing the photoresist to form a mask over the substrate 12 to define protected areas and areas wherein material is to be subsequently removed, baking the wafer, etching away portions of the III–V compound semiconductor layers not protected by the photoresist, and stripping the protected areas of the photoresist so that further processing can take place.

In FIG. 2, the moveable optical waveguide 14 is attached on one end thereof to the substrate 12 by a layer of an epitaxially deposited sacrificial material 26 (e.g. $Al_xGa_{1-x}As$ with $x \geq 0.5$), the majority of which is removed underneath the waveguide 14 by a selective etchant so that the remainder of the waveguide 14 is cantilevered above the substrate 12 by a distance of, for example, 2 microns ($\mu m$). This cantilevered portion of the waveguide 14 is thus free to be electrostatically moved laterally (i.e. in the plane of the substrate 12) so that the end 18 thereof can be optically aligned with one or the other of the fixed optical waveguides 20 or 20' as will be described in detail hereinafter.

In addition to the core layer 22 and the surrounding cladding layers 24 and 24', the cantilevered portion of the moveable optical waveguide 14 in FIGS. 1 and 2 can comprise a cap layer 28 over the uppermost cladding layer 24. The cap layer 28, which comprises a III–V compound semiconductor (e.g. GaAs or InP), is doped to provide electrical conductivity to a plurality of moveable fingers 30 which are attached to the moveable optical waveguide 14 and which form a moveable electrostatic comb of the electrostatic actuator 16 (see FIG. 1).

In the first example of the optical waveguide switch in FIGS. 1 and 2, the waveguide core layer 22 can be 2 $\mu m$ thick, the cladding layers 24 and 24' can each be 1 $\mu m$ thick, and the cap layer can be 0.2 $\mu m$ thick. The width of the moveable optical waveguide 14 can be 3 $\mu m$ to form a multi-mode optical waveguide 14 that can support low-loss propagation of a fundamental optical mode therein. These dimensions are further suitable for polarization-independent transmission of light at wavelengths in the range of 1.25–1.65 $\mu m$. The same epitaxial layer thicknesses and width are used for the fixed optical waveguides 20 and 20' in FIG. 1.

Those skilled in the art will understand that the exact layer thicknesses of the various III–V compound semiconductor layers and the width of the optical waveguides 14, 20 and 20' are a matter of design choice, and will further depend upon a particular wavelength or range of wavelengths for which the optical waveguide switch 10 is to be used. Additionally, the core layer 22 can include one or more quantum wells therein, for example, to control polarization of the light therein or to form one or more electro-active devices (e.g. light sources, gain sections, modulators, photodetectors, etc.) from portions of the optical waveguides 14, 20 and 20'. The core layer 22 and the cladding layers 24 and 24' are generally left undoped (i.e. not intentionally doped), although these layers can be optionally doped during epitaxial growth to form a semiconductor p-n or p-i-n junction when one or more electro-active devices are to be formed from portions of the optical waveguides 14. The layer of the sacrificial material 26 is also generally left undoped to provide electrical isolation between the moveable optical waveguide 14 and the electrostatic actuator 16. The substrate 12 can also be semi-insulating to provide additional electrical isolation, although this is optional.

Returning to FIG. 1, the moveable fingers 30 are formed by patterning the layers 22, 24, 24' and 28, with the layer of the sacrificial material 26 being removed underneath the moveable fingers 30. The moveable fingers 30 of the moveable electrostatic comb are interdigitated with a plurality of stationary fingers 32 forming a stationary electrostatic comb, with each finger 30 and 32 being, for example, 2 $\mu m$ wide and separated from an adjacent finger by about 1 $\mu m$. The exact length of the fingers, 30 and 32, will depend on a range of lateral movement of the moveable optical waveguide 14, which in turn will depend upon the number and spacing of the fixed optical waveguides. In the example of FIGS. 1 and 2, where a pair of fixed optical waveguides 20 and 20' are used, each being 3 $\mu m$ wide and separated by 4 $\mu m$, the length of the fingers, 30 and 32, can be 5–10 $\mu m$. In other embodiments of the present invention, the fingers 30 and 32 can be 10–50 $\mu m$ long or more, and can be straight or curved (see FIG. 4).

In FIG. 1, the fingers 30 are spaced apart and interconnected to form a moveable electrostatic comb attached on either side of the moveable optical waveguide 14, with each moveable electrostatic comb being separated from the moveable optical waveguide 14 by an air gap 34. The air gaps 42 are advantageous for minimizing perturbations in the width of the moveable optical waveguide 14 due to attachment of the moveable electrostatic combs and thereby maintaining a low propagation loss in the moveable optical waveguide 14. The air gaps 34 can be formed by etching down completely through the III–V compound semiconductor layers 22, 24, 24' and 28.

In FIG. 1, a stationary electrostatic comb of the electrostatic actuator 16 is formed from the interconnected stationary fingers 32. This stationary electrostatic comb is built up from the layers 22, 24, 24', 26 and 26 in FIG. 2 with a contact metallization 36 provided above the cap layer 28 over a majority of the stationary electrostatic comb except for the fingers 32. The contact metallization 36 increases the electrical conductivity to the fingers 32 and allows the attachment of lead wires (not shown) to each stationary electrostatic comb. It should be noted that the layer of the sacrificial material 26 will generally be removed, at least in part, underneath the stationary fingers 32 during a step for removing the layer of the sacrificial material 26 underneath the cantilevered portion of the moveable optical waveguide 14 (see FIG. 3D).

FIGS. 3A–3D show schematic cross-section views along the section line 2—2 in FIG. 1 to illustrate formation of the optical waveguide switch 10 of the present invention. FIGS. 3A–3D will be described in terms of fabricating an optical waveguide switch 10 on a GaAs substrate 12 by epitaxial growth and patterning of a plurality of III–V compound semiconductor layers comprising GaAs and $Al_xGa_{1-x}As$. However, those skilled in the art will understand that the teaching of the present invention in FIGS. 3A–3D can be applied to the formation of an optical waveguide switch 10 on other III–V compound semiconductor substrates (e.g. InP) using other types of III–V semiconductor layers (e.g. InGaAs/InAlAs or GaAsSb/AlAsSb) for the core and cladding layers.

Figure 3A:
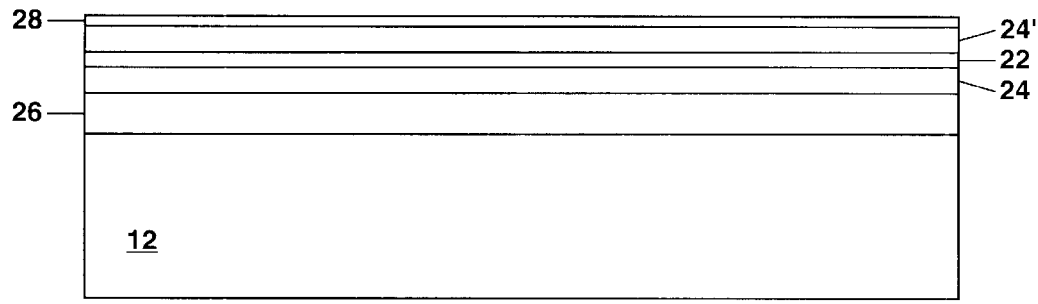
FIGS. 3A–3D show schematic cross-section views along the section line 2—2 in FIG. 1 to illustrate fabrication of the optical waveguide switch of the present invention.

In FIG. 3A, the various III–V compound semiconductor layers are epitaxially grown on the substrate 12. Although not shown, a buffer layer having the same semiconductor alloy composition (e.g. GaAs or InP) as the substrate 12 can be optionally grown on the substrate 12 to provide a smooth defect-free surface upon which to epitaxially grow the subsequent III–V compound semiconductor layers.

The epitaxial layers in order of growth can include, for example, a 2-μm-thick layer of $Al_{0.70}Ga_{0.30}As$ to form the sacrificial material 26; a 1-μm-thick layer of $Al_{0.04}Ga_{0.96}As$ to form a lower cladding layer 24; a 2-μm-thick layer of GaAs to form the waveguide core 22; a 1-μm-thick layer of $Al_{0.04}Ga_{0.96}As$ to form an upper cladding layer 24'; and a 0.2-μm-thick layer of GaAs to form the cap layer 28. All epitaxial growths can be performed at a substrate temperature of 590° C. using MBE. The various layers 26, 24, 22, 24' are not intentionally doped; and the cap layer 28 can be n-type doped, for example, to $3\times10^{18}$ cm$^{-3}$ with silicon. The substrate 12 in this example can comprise a 625-μm-thick wafer of undoped (100)-oriented GaAs. This epitaxial layer structure is suitable for forming a waveguide switch 10 for operation at a wavelength of about 1.3 μm.

Figure 3B:
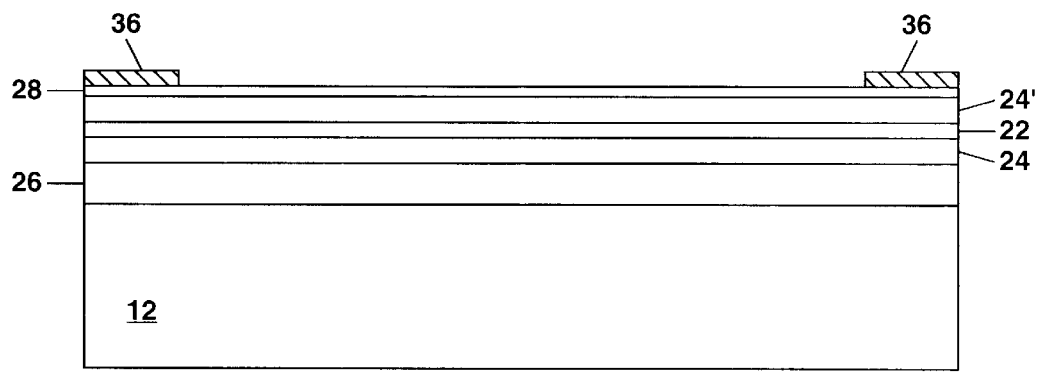

In FIG. 3B, after epitaxial growth of the III–V compound semiconductor layers, a layer of contact metallization 36 can be deposited (e.g. by evaporation or sputtering) over the substrate 12 and patterned (e.g. by masking followed by lift-off or plasma etching) to form electrical contacts for the electrostatic actuator 16. The contact metallization can be, for example, a nickel-germanium-gold (Ni-Ge-Au) metallization as known to the art when the cap layer 28 is n-type doped. Alternately, a titanium-platinum-gold metallization as known to the art can be used when the cap layer 28 is p-type doped. The contact metallization 36 can be annealed, if needed, although no annealing of the III–V compound semiconductor layers is needed due to their high crystalline quality and low internal stress resulting from lattice matching the layers 22, 24, 24', 26 and 28 with each other and with the substrate 12.

Since electrical current flow in the electrostatic actuator 16 is very small, the contact metallization 36 need not cover the entirety of the stationary electrostatic combs and preferably does not cover the optical waveguide 14 which includes the moveable electrostatic combs (see FIGS. 1 and 2). Electrical contact to the moveable optical waveguide 14 can be made through the cap layer 28 which is doped for electrical conductivity and which underlies the contact metallization 36.

Figure 3C:
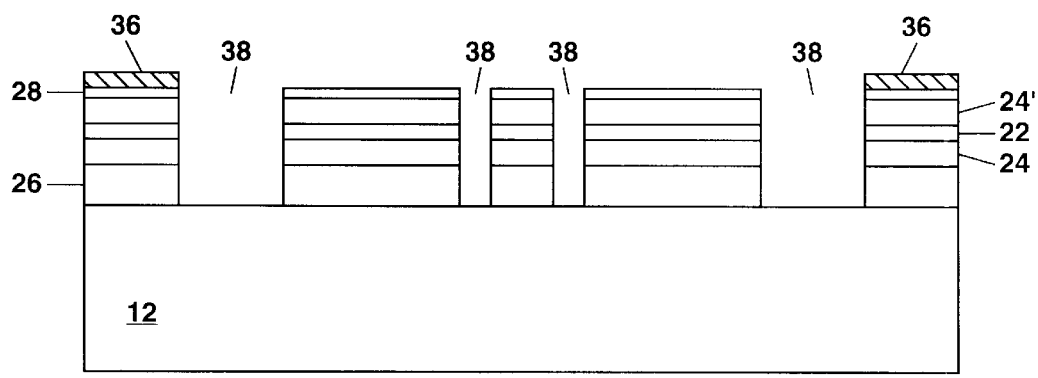

In FIG. 3C, an anisotropic etching step can be used to form the fixed optical waveguides 20 and 20', the moveable optical waveguide 14, the electrostatic actuator 16 and any stops 40. This anisotropic etching step, which can be performed using chlorine reactive ion beam etching or chemically-assisted ion beam etching as known to the art, is performed by etching down partially or entirely through the III–V compound semiconductor layers to expose the sacrificial material 26 for later removal underneath selected portions of the optical waveguide device 10.

This anisotropic etching step also forms the end 18 of the moveable optical waveguide 14 and ends of the fixed optical waveguides 20 and 20' which can be spaced from the end 18 by a quarter wavelength (λ/4) or a multiple thereof when the waveguide 14 is optically aligned with one of the fixed optical waveguides 20 or 20' during switching. The precise spacing between the ends of the waveguides 14 and 20 or 20' is possible since during fabrication, the ends of the waveguides 14, 20 and 20' are spaced apart from each other so that the anisotropic etching can be well controlled to produce a vertical etching profile for the ends of each optical waveguide 14, 20 and 20'.

Figure 3D:
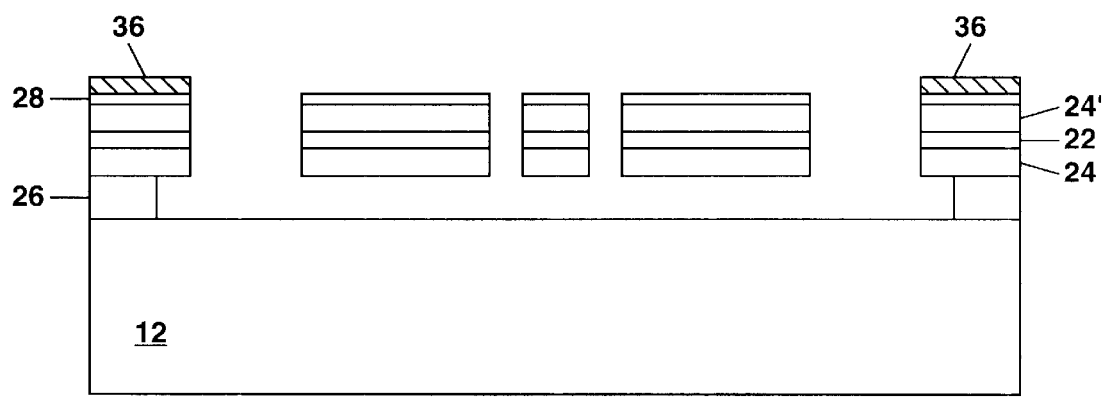

In FIG. 3D, the sacrificial material 26 is removed from underneath the cantilevered portion of the moveable optical waveguide 14. This can be done by providing an etch mask (not shown) over portions of the optical waveguide device 10 that are to be left attached to the substrate 12 and then using a selective wet etchant to etches away unmasked portions of the sacrificial material 26 while not substantially etching the overlying epitaxial layers 22, 24, 24' and 28. The contact metallization 36 can also be protected from etching by the etch mask. The time duration of this selective etching step can be used to limit lateral undercutting of the sacrificial material 26 underneath the etch mask. However, some lateral undercutting will occur so that the sacrificial material 26 will generally be completely removed underneath the fingers 32 of each stationary electrostatic comb.

Etchants for selectively removing III–V compound semiconductor sacrificial materials are well known in the art (see e.g. K. Hjort, "Sacrificial Etching of III–V Compounds for Micromechanical Devices," *Journal of Micromechanics and Microengineering*, vol. 6, pp. 370–375, 1996). Those skilled in the art will understand that an etchant comprising hydrofluoric acid (HF) etches binary, ternary or quaternary III–V compound semiconductor alloy compositions having high contents of AlAs and AlSb, but not those with high contents of GaAs, InP or InAs. An etchant comprising hydrochloric acid (HCl) will etch semiconductor alloy compositions having a high content of AlAs and InP, but not compositions having a high content of GaAs or InAs. An etchant comprising an organic etchant (e.g. citric acid) will etch semiconductor alloy compositions having a high content of GaAs or InAs, but not compositions having a high content of AlAs, AlSb or InP.

In the example of FIGS. 1 and 2, where the sacrificial material 26 comprises $Al_{0.7}Ga_{0.3}As$, the selective etchant can comprise, for example, a 1:3 solution of HF:H$_2$O used at room temperature. This selective etchant is generally useful for selectively removing $Al_xGa_{1-x}As$ with x≧0.5 while not substantially chemically attacking GaAs or $Al_xGa_{1-x}As$ with a low aluminum content, x (e.g. x=0.04). In FIG. 3D, this selective etchant can be timed to completely remove the sacrificial material 26 underneath the cantilevered portion of the waveguide 14, thereby releasing this portion for movement. Once the etching is completed, the substrate 12 with the completed optical waveguide switch 10 can be cleaned, dried and packaged for use using methods well known to the art.

Figure 4:
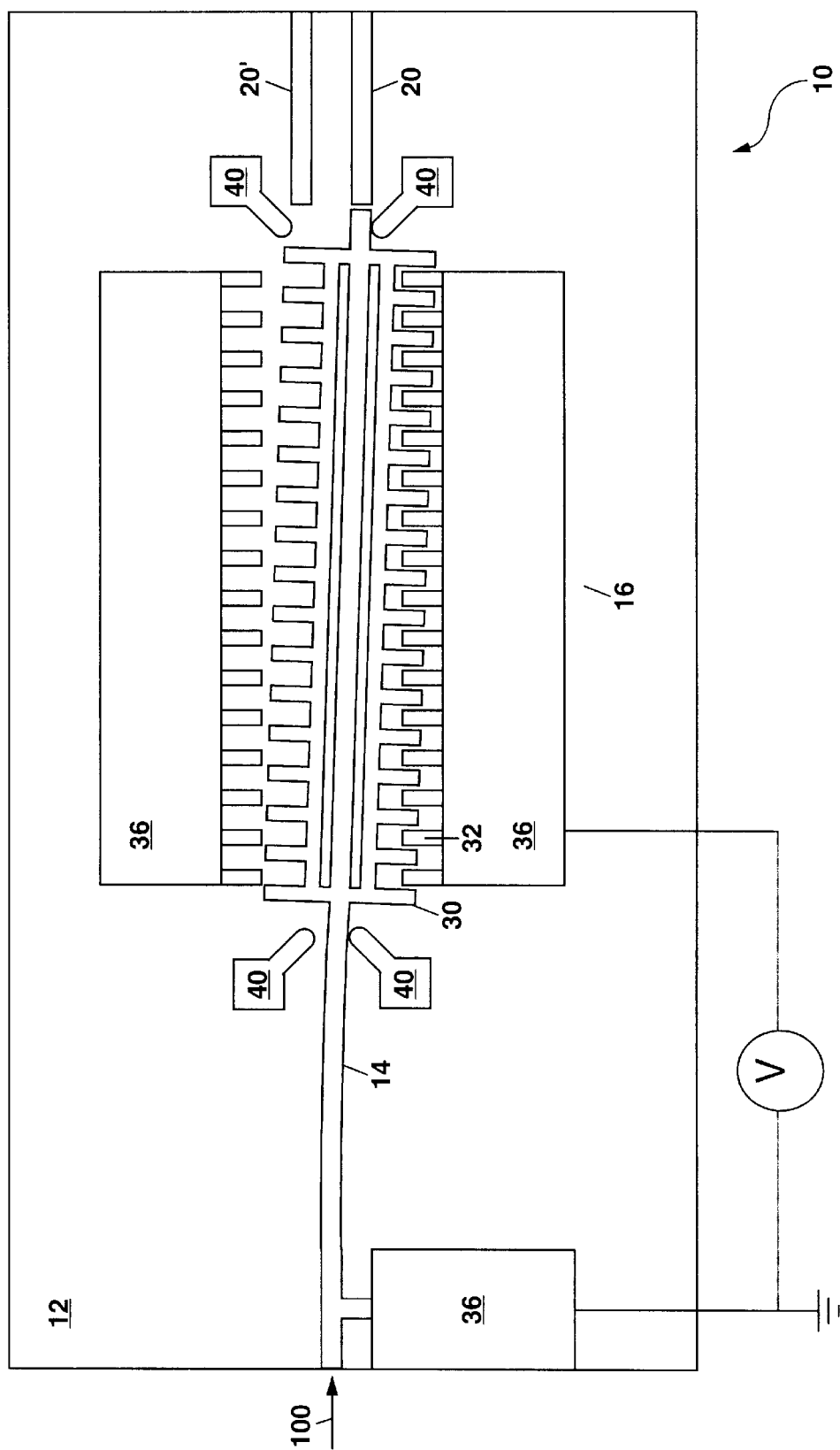
FIG. 4 schematically illustrates operation of the optical waveguide switch in FIG. 1 to allow light to be coupled between the moveable optical waveguide and one of the fixed optical waveguides.

In operation of the optical waveguide switch 10, the moveable optical waveguide 14 together with the moveable fingers 30 attached thereto forms a moveable electrostatic comb that can be electrically grounded as shown in FIG. 4. An actuation voltage, V, from a power source can then be applied between the moveable electrostatic comb and a stationary electrostatic comb located on the same side of the moveable optical waveguide 14 as the fixed optical waveguide 20. The actuation voltage, V, generates an electrostatic force of attraction between the interdigitated fingers 30 and 32 on this side of the moveable optical waveguide 14 so that the cantilevered portion of the moveable optical waveguide 14 is laterally bent with the end 18 thereof being urged into alignment with the fixed optical waveguide 20 as shown in FIG. 4. The light 100 can then be coupled between the two waveguides 14 and 20 which are now in optical alignment with each other. To switch the light 100 in the other direction (i.e. between the moveable optical waveguide 14 and the fixed optical waveguide 20'), the actuation voltage, V, can be applied to the stationary electrostatic comb located on other the side of the moveable optical waveguide 14 wherein the fixed optical waveguide 20' is located. During activation of a particular stationary electrostatic comb, the other stationary electrostatic comb can be electrically grounded.

The design of the optical waveguide switch 10 of the present invention allows the cantilevered end 18 of the moveable optical waveguide 14 to be made narrow (e.g. about 3 $\mu$m wide) so that the fixed optical waveguides 20 and 20', which are preferably of the same width, can be relatively closely spaced to slightly more than the waveguide width. As a result, the cantilevered end 18 of the moveable optical waveguide 14 need only move laterally by a small distance (e.g. 4 $\mu$m) in either direction to couple the light 100 between the moveable optical waveguide 14 and one or the other of the fixed optical waveguides 20 and 20'. This results in a low actuation voltage on the order of 15 volts or less.

As an aid in laterally aligning the cantilevered end 18 of the moveable optical waveguide 14 with the fixed optical waveguides 20 and 20' and to prevent possible electrical short circuiting of the fingers 30 and 32, stops 40 can be located on either side of the cantilevered portion of the moveable optical waveguide 14 as shown in FIG. 1. These stops 40 can be formed from the III–V compound semiconductor layers 26, 24, 22, 24' and 28 using the patterning step described with reference to FIG. 3C, with some undercutting of the sacrificial material 26 resulting from the selective etching step described with reference to FIG. 3D, especially for a narrowed and rounded portion of each stop 40 which comes into contact with the cantilevered portion of the moveable optical waveguide 14. Additionally, the stops 40 can be rounded as shown in FIG. 1 to provide a limited contact area with the moveable optical waveguide 14 and can be electrically grounded to prevent adhesion (also termed stiction) of the moveable optical waveguide 14 to the stops 40 which might prevent return of the moveable optical waveguide 14 to an initial "as-fabricated" position once the actuation voltage, V, is removed.

In other embodiments of the present invention, the stops 40 can include a mechanically- or electrically-releasable latch (not shown) to retain the cantilevered portion of the moveable optical waveguide 14 in optical alignment with one of the fixed optical waveguides 20 or 20' in the event that electrical power to the device 10 is interrupted. Such a latch can be fabricated from the same III–V compound semiconductor layers shown in FIG. 2.

In the example of FIG. 1, the light 100 can be coupled into the moveable optical waveguide 14 from an input optical fiber (not shown) or source (i.e. a laser or light-emitting diode) and can be coupled out of the fixed optical waveguides 20 and 20' through output optical fibers. Those skilled in the art will understand that the optical waveguide switch 10 is bidirectional so that the light 100 can be coupled through the device 10 in either direction.

A mode-expanding optical coupler (also termed a mode converter) can be optionally formed on the ends of the waveguides 14, 20 and 20' or butt-coupled thereto to enhance the coupling efficiency of the light 100 into and out from the optical waveguide switch 10. Such a mode converter is disclosed, for example, in U.S. Pat. No. 6,229,947 to Vawter, which is incorporated herein by reference. This optional mode converter expands an optical mode of the light in the vertical direction (i.e. perpendicular to the plane of the substrate 12) to provide a better match between the waveguide mode of the light 100 propagating in the optical waveguide switch 10 and that which propagates in the input and output optical fibers which are preferably single-mode optical fibers.

An anti-reflection coating can also be optionally deposited on one or both ends of each waveguide 14, 20 and 20' to reduce coupling and propagation losses in the optical waveguide switch 10. These anti-reflection coating can be, for example, a single one-quarter wavelength ($\lambda/4$) thick layer of a dielectric material having a refractive index, n, which is approximately equal to the square root of the index of refraction, n, of the high-refractive-index III–V compound semiconductor material forming the waveguide core layer 22. As an example, when the waveguide core layer 22 comprises GaAs, the dielectric material can comprise silicon nitride (SiN), silicon oxynitride ($SiO_xN_y$) or magnesium oxide (MgO). These anti-reflection coatings can be deposited with the substrate 12 tilted at an angle (e.g. $\pm 45°$).

Figure 5:
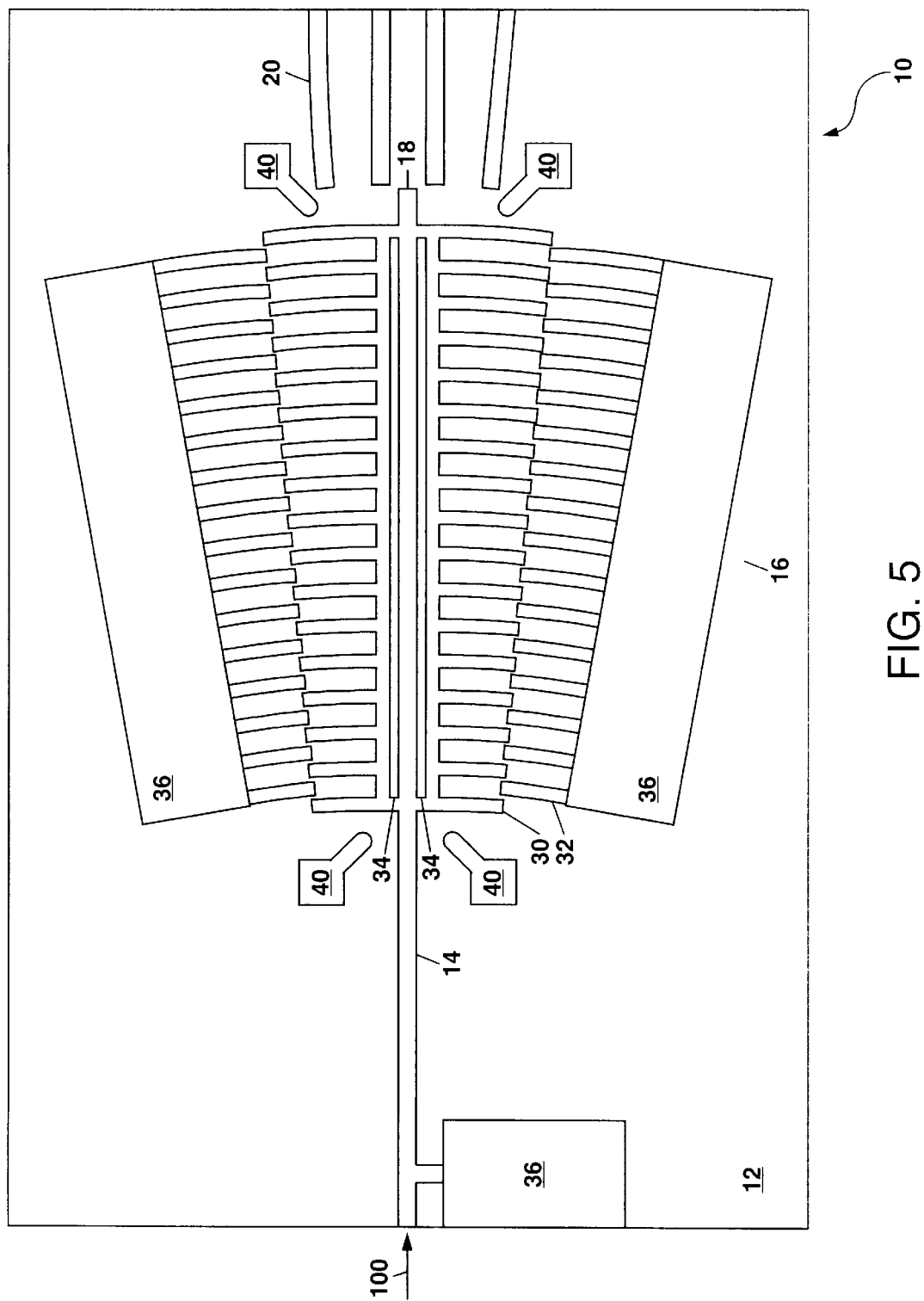
FIG. 5 schematically illustrates in plan view a second example of the optical waveguide switch of the present invention.

FIG. 5 shows a second example of the optical waveguide switch 10 of the present invention. In this example of the present invention, the electrostatic actuator 16 is formed with a plurality of curved fingers 30 and 32 to allow a greater range of movement of the cantilevered end 18 of the moveable optical waveguide 14 so that switching of the light 100 can occur between the moveable optical waveguide 14 and multiple fixed optical waveguides 20. In FIG. 5, the fixed optical waveguides 20 can also be angled or curved as needed so that their ends are substantially parallel to the end 18 of the moveable optical waveguide 14 when the waveguides 14 and 20 are in optical alignment with each other. The optical waveguide switch in FIG. 5 can be fabricated as described previously with reference to FIGS. 3A–3D.

Switching of the light 100 between the moveable optical waveguide 14 and the innermost fixed optical waveguides 20 in FIG. 5 can be performed by applying a predetermined level of actuation voltage, V, between the fingers 30 and 32 on one side or the other of the moveable optical waveguide 14. The light 100 transmitted between the moveable optical waveguide 14 and each fixed optical waveguide 20 can be optionally sensed and used in a feedback loop (not shown) to control the exact value of the actuation voltage, V, required to optimize and maintain optical alignment. For the outermost fixed optical waveguides 20 in FIG. 4, stops 40 can be provided for precise optical alignment and to prevent contact of the fingers 30 and 32 which could otherwise possibly result in electrical short circuiting therebetween. These stops 40 also allow the outermost fixed optical waveguides 20 to be located beyond the point where the electrostatic actuator 16 exhibits an instability. Generally, this instability arises in electrostatic comb actuators due to an ever-increasing force of attraction once the fingers therein are meshed to a distance greater than one-third of the length of the fingers.

Although the example of FIG. 5 illustrates an optical waveguide switch 10 having four output waveguides 20, those skilled in the art will understand that a larger number of fixed optical waveguides 20 can be used, with the exact number of fixed optical waveguides 20 being determined by several factors including the width and spacing of the fixed optical waveguides 20, the length of the fingers 30 and 32 in the electrostatic actuator 16 and the resilience of the cantilevered portion of the moveable optical waveguide 14.

Figure 6:
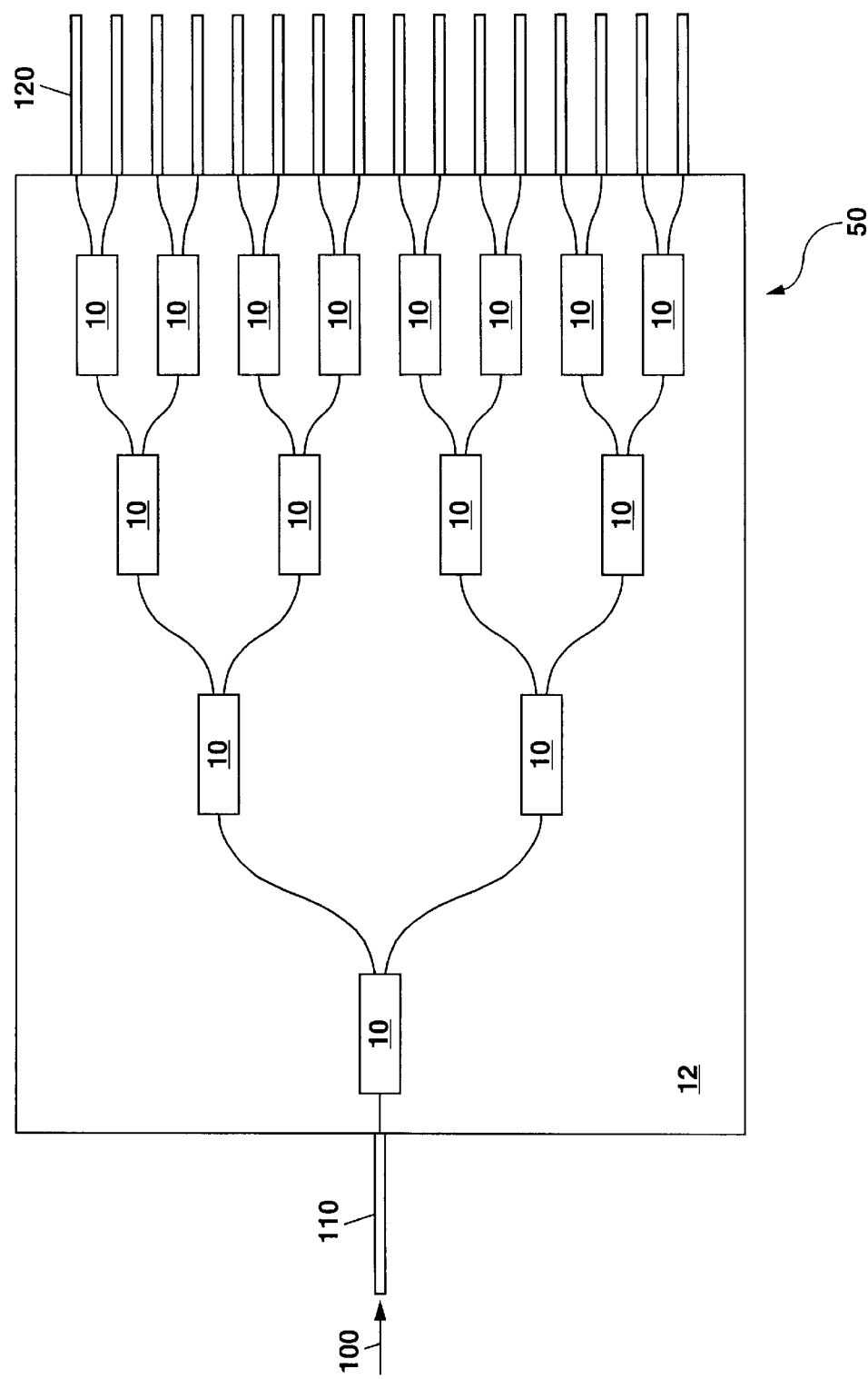
FIG. 6 schematically illustrates in plan view a plurality of optical waveguide switches according to FIG. 1 arranged on a common substrate and interconnected to form a 1×16 optical waveguide switching network.

FIG. 6 schematically illustrates an optical waveguide switching network 50 formed by fabricating a plurality of optical waveguide switches 10 on a common substrate 12 and interconnecting the switches 10 so that light 100 emerging from the fixed optical waveguide 20 of one optical waveguide switch 10 is directed into the moveable optical waveguide 14 of an adjacent switch 10 for further routing. The optical waveguide switching network 50 can perform optical signal routing, for example, operating as a 1×n optical switch, where n is arbitrary (e.g. 16 as shown in FIG. 6). Such an optical switching network 50 can thus be used to route optical signals between a single input optical fiber 110 and a plurality of output optical fibers 120 as shown in FIG. 6, or between a plurality of input and output optical fibers. The optical switching network 50 is bidirectional so that the light 100 can be propagated in both directions (i.e. from the input optical fibers 110 to the output optical fibers 120 and vice versa). The input and output optical fibers 110 and 120 are preferably single-mode optical fibers. Those skilled in the art will understand that the number of optical waveguide switches 10 provided on the common substrate 12 and the interconnections between the various switches 10 will depend upon a particular application for the optical waveguide switching network 50. The optical waveguide switching network 50 can be fabricated as described previously with reference to FIGS. 3A–3D.

Other applications and variations of the present invention will become evident to those skilled in the art. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. An optical waveguide switch, comprising:
   (a) a moveable optical waveguide formed from a plurality of III–V compound semiconductor layers epitaxially deposited on a substrate, with the moveable optical waveguide having a portion thereof cantilevered above the substrate, and with an end of the cantilevered portion being moveable in the plane of the substrate; and
   (b) an electrostatic actuator operatively coupled to the moveable optical waveguide to move the end of the cantilevered portion in the plane of the substrate and into optical alignment with one of a plurality of fixed optical waveguides formed on the substrate from the same plurality of epitaxially-deposited compound semiconductor layers.

2. The optical waveguide switch of claim 1 wherein the plurality of epitaxially-deposited III–V compound semiconductor layers comprises a high-refractive-index compound semiconductor layer sandwiched between a pair of lower-refractive-index compound semiconductor layers.

3. The optical waveguide switch of claim 2 wherein the high-refractive-index III–V compound semiconductor layer is selected from the group consisting of gallium arsenide (GaAs), gallium arsenide antimonide (GaAsSb) and indium gallium arsenide (InGaAs), and the lower-refractive-index III–V compound semiconductor layers are selected from the group consisting of aluminum gallium arsenide (AlGaAs), aluminum arsenide antimonide (AlAsSb) and indium aluminum arsenide (InAlAs).

4. The optical waveguide switch of claim 3 wherein the substrate comprises gallium arsenide (GaAs) or indium phosphide (InP).

5. The optical waveguide switch of claim 1 wherein the electrostatic actuator comprises at least one pair of meshed electrostatic combs, with each pair of the meshed electrostatic combs further comprising a fixed electrostatic comb supported on the substrate, and a moveable electrostatic comb attached to the cantilevered portion of the moveable optical waveguide.

6. The optical waveguide switch of claim 1 further comprising a plurality of stops formed on the substrate to limit motion of the cantilevered portion of the moveable optical waveguide.

7. The optical waveguide switch of claim 1 further comprising an anti-reflection coating formed on the end of the cantilevered portion of the moveable optical waveguide.

8. The optical waveguide switch of claim 7 further comprising an antireflection coating formed on an end of each of the plurality of fixed optical waveguides proximate to the end of the cantilevered portion of the moveable optical waveguide.

9. An optical waveguide switching network formed on a substrate, and comprising a plurality of interconnected optical waveguide switches according to claim 1.

10. An optical waveguide switch, comprising:
    (a) a III–V compound semiconductor substrate;
    (b) a pair of fixed optical waveguides formed on the substrate from a plurality of III–V compound semiconductor layers including a pair of cladding layers sandwiched about a core layer; and
    (c) a moveable optical waveguide formed on the substrate from the plurality of III–V compound semiconductor layers, with the moveable optical waveguide having a cantilevered end thereof which is electrostatically moveable into alignment with one or the other of the pair of fixed optical waveguides.

11. The optical waveguide switch of claim 10 wherein the cantilevered end of the moveable optical waveguide includes an antireflection coating formed thereon.

12. The optical waveguide switch of claim 10 wherein the core layer comprises gallium arsenide (GaAs) and the cladding layers comprise aluminum gallium arsenide (AlGaAs).

13. The optical waveguide switch of claim 12 wherein the III–V compound semiconductor substrate comprises gallium arsenide (GaAs).

14. The optical waveguide switch of claim 10 wherein the core layer comprises gallium arsenide antimonide (GaAsSb) and the cladding layers comprise aluminum arsenide antimonide (AlAsSb).

15. The optical waveguide switch of claim 14 wherein the III–V compound semiconductor substrate comprises indium phosphide (InP).

16. The optical waveguide switch of claim 10 wherein the core layer comprises indium gallium arsenide (InGaAs), and the cladding layers comprise indium aluminum arsenide (InAlAs).

17. The optical waveguide switch of claim 16 wherein the III–V compound semiconductor substrate comprises indium phosphide (InP).

18. The optical waveguide switch of claim 10 further including an electrostatic actuator operatively coupled to electrostatically move the cantilevered end of the moveable optical waveguide into alignment with one of the pair of the fixed optical waveguides.

19. The optical waveguide switch of claim 18 wherein the electrostatic actuator comprises at least one pair of meshed electrostatic combs, with each pair of the meshed electrostatic combs further comprising a fixed electrostatic comb supported on the substrate, and a moveable electrostatic comb attached to the cantilevered end of the moveable optical waveguide.

20. An optical waveguide switching network formed on a substrate, and comprising a plurality of interconnected optical waveguide switches according to claim 10.

21. A method for forming an optical waveguide switch, comprising steps for:
  (a) epitaxially depositing a plurality of III–V compound semiconductor layers on a substrate including, in order of epitaxial growth, a layer of a sacrificial material, a lower cladding layer, a waveguide core layer, an upper cladding layer, and a cap layer;
  (b) depositing a contact metallization on the substrate over portions of the cap layer wherein electrical connections to the optical waveguide switch are to be made;
  (c) anisotropically etching down through the plurality of III–V compound semiconductor layers for exposing portions of the sacrificial material, and for defining shapes for a moveable optical waveguide, a plurality of fixed optical waveguides and an electrostatic actuator; and
  (d) forming a cantilevered portion of the moveable optical waveguide by selectively etching away the exposed portions of the sacrificial material using a selective wet etchant.

* * * * *